(12) United States Patent
Farn et al.

(10) Patent No.: US 6,658,114 B1
(45) Date of Patent: Dec. 2, 2003

(54) KEY MANAGEMENT METHOD

(75) Inventors: Kwo-Jean Farn, Hsinchu (TW);
Cheng-Tsung Chao, Taipei (TW);
Chi-Kuo Hsu, Taoyuan Hsien (TW);
Chen-Hwa Song, Taipei (TW)

(73) Assignee: Industrial Technology Research Institute (TW)

( * ) Notice: Subject to any disclaimer, the term of this patent is extended or adjusted under 35 U.S.C. 154(b) by 0 days.

(21) Appl. No.: 09/373,081

(22) Filed: Aug. 11, 1999

(30) Foreign Application Priority Data

May 31, 1999 (TW) ........................... 88108947 A

(51) Int. Cl.[7] ................................. G06F 1/24
(52) U.S. Cl. ..................... 380/277; 380/278; 713/156; 713/168; 713/169
(58) Field of Search ................. 380/277, 278, 380/283; 713/156, 168, 169, 171

(56) References Cited

U.S. PATENT DOCUMENTS 5,757,920 A * 5/1998 Misra et al. ................ 713/158
5,812,784 A * 9/1998 Watson et al. .............. 709/227

* cited by examiner

Primary Examiner—Thomas R. Peeso
(74) Attorney, Agent, or Firm—Birch, Stewart, Kolasch & Birch, LLP

(57) ABSTRACT

A key management method to prevent illegal eavesdropping in a network system. Keys of the network system are divided into several family subkeys and several communication subkeys. A plurality of trusted-key centers are provided for respectively preserving a part of the family subkeys and one of the communication subkeys, and generating a one-way hash value involving the preserved communication subkey and an open information. Each of the trusted-key centers passes the hash value to an eavesdropper according to an authority certificate. Each of the trusted-key centers interchanges the preserved family subkeys according to the authority certificate to obtain a session key which is passed to the eavesdropper. The eavesdropper combines all the hash values from the trusted-key centers to obtain a corresponding communication key which is accompanied by the session key to eavesdrop an authorized communication.

14 Claims, 2 Drawing Sheets

KEY MANAGEMENT METHOD

BACKGROUND OF THE INVENTION

1. Field of the Invention

The present invention relates to cryptographic communication, and in particular to a key management method to prevent illegal eavesdropping in a network system, wherein keys of the network system are divided into several family subkeys and several communication subkeys which are respectively preserved in plural trusted-key centers and are not available to any single trusted-key center, and in which communication keys are valid only during an authorized time period.

2. Description of the Related Art

FIG. 1 (Prior Art) is a diagram illustrating a current cryptographic network system. In FIG. 1, a trusted-key center CA is provided in the network system to preserve all session keys and to ensure data security, such as preventing passive eavesdropping and active tampering. When a user $P_i$ and another user $P_j$ want to communicate with each other on a telephone system or a communication system, the sender, e.g., the user $P_i$, first passes a to-be-transferred message m to a cipher device 10. The cipher device 10 then encrypts the input message m using a corresponding session key $K_{ij}$ and outputs the encrypted message $E_{kij}(m)$ to a decipher device 20 at the receiving terminal thereof. Thereafter, the decipher device 20 decrypts the encrypted message $E_{kij}(m)$ using the same session key $K_{ij}$ and then outputs the recovered message m to the receiver, e.g., the user $P_j$.

In the cryptographic network system, once an eavesdropper $P_k$ is authorized to eavesdrop the communication between the user $P_i$ and the user $P_j$, the trusted-key center CA will pass the corresponding session key $K_{ij}$ to the eavesdropper $P_k$. However, the session key $K_{ij}$ preserved in the trusted-key center CA is not refreshed frequently, so the eavesdropper $P_k$ can still use the previously obtained session key $K_{ij}$ to eavesdrop the communication between the user $P_i$ and the user $P_j$, even after the authority has expired.

Furthermore, due to a possible security compromise of the trusted-key center CA, a potential security risk is realized when all the session keys of a network system are stored in a single trusted-key center.

SUMMARY OF THE INVENTION

Therefore, it is an object of the present invention to provide a key management method for a network system, wherein keys of the network system are divided into several family subkeys and communication subkeys which are respectively preserved in plural trusted-key centers and are not available to any single trusted-key center, in order to prevent compromise of secure communications in the network system.

It is another object of the present invention to provide a key management method for a network system, wherein communication keys are not valid except during an authorized time period to prevent illegal eavesdropping.

It is another object of the present invention to provide a key management method for a network system, wherein each of the trusted-key centers generates a time-related and irreversible hash value which is used to calculate communication keys of the network system, so that the communication subkeys preserved in each of the trusted-key centers can be refreshed at a lower frequency.

It is another object of the present invention to provide a key management method for a network system, wherein each of the trusted-key centers only preserve subkeys of an order of $t^2$, where t is the number of all network users. Because it is very fast to compute a one-way hash function, the computation loading for each of the trusted-key centers is very low.

To achieve the above and other objects, the present invention provides a key management method to prevent illegal eavesdropping in a network system. This method includes the following steps. First, keys of the network system are divided into several family subkeys and several communication subkeys. Then, a few trusted-key centers are provided for respectively preserving a part of the family subkeys and one of the communication subkeys, and generating a one-way hash value involving the preserved communication subkey and an open information. Thereafter, each of the trusted-key centers passes the hash value to an eavesdropper according to an authority certificate. Each of the trusted-key centers interchanges the preserved family subkeys according to the authority certificate to obtain a session key which is passed to the eavesdropper. Then, the eavesdropper combines all the hash values from the trusted-key centers to obtain a corresponding communication key, which is accompanied by the session key, in order to eavesdrop an authorized communication.

In this key management method, the open information may be a current time. The hash value may be obtained by calculating a one-way hash function of a sum of the preserved communication subkey and the current time. The communication key may be combined by adding all the hash values from the trusted-key centers.

BRIEF DESCRIPTION OF THE DRAWINGS

Further objects, features and advantages of the present invention will become apparent from the following detailed description of a preferred embodiment of the invention with reference to the accompanying drawings.

DETAILED DESCRIPTION OF THE INVENTION

In order to prevent compromise of a single trusted-key center, the present invention divides all keys of the network system into several family subkeys and several communication subkeys, and respectively preserves the family subkeys and the communication subkeys in plural trusted-key centers. Each of the trusted-key centers is unable to obtain session keys without the permission of the other trusted-key centers. In addition, a current time is also involved with the communication keys to prevent illegal eavesdropping during unauthorized time periods.

Figure 1:
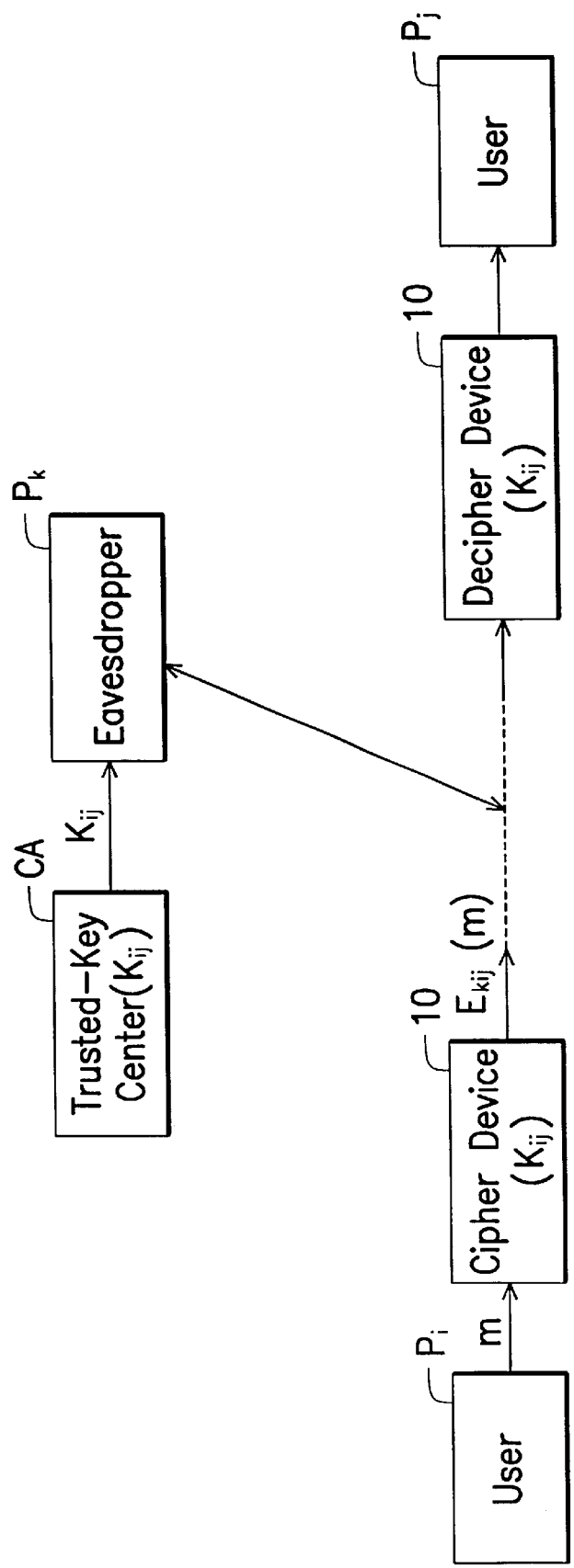
FIG. 1 (Prior Art) is a diagram illustrating a current cryptographic network system.
Figure 2:
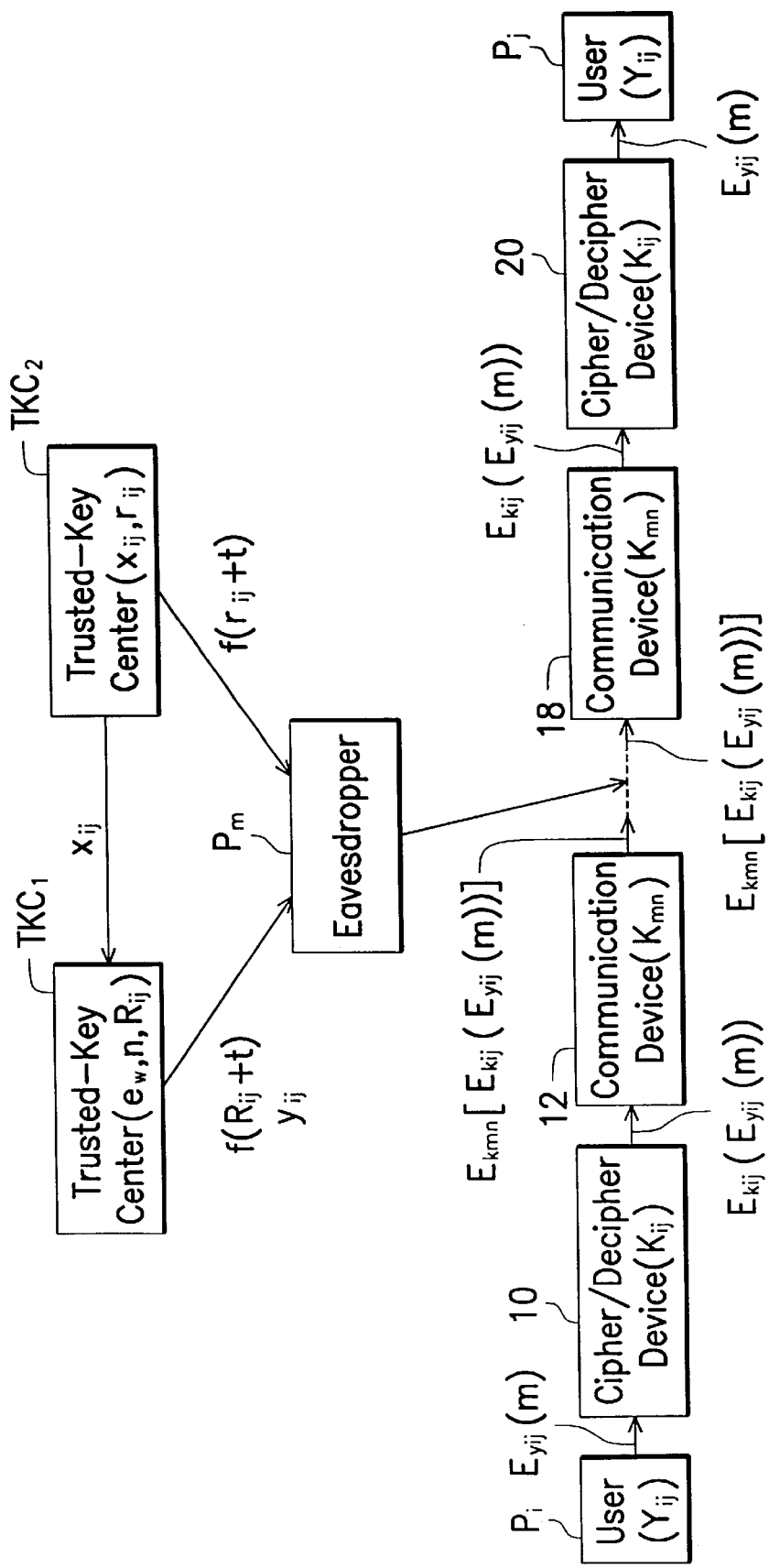
FIG. 2 is a diagram illustrating a cryptographic network system according to the present invention.

FIG. 2 is a diagram illustrating a cryptographic network system according to the present invention.

In normal situations (without an eavesdropper $P_m$), a sender, e.g., a user $P_I$, first encrypts a to-be-transferred message m using a session key $Y_{ij}$ to obtain a message $E_{yij}(m)$ and transfers the message $E_{yij}(m)$ to a cipher/decipher device 10. The cipher/decipher device 10 then encrypts the message $E_{yij}(m)$ using a communication key $K_{ij}$ to obtain a message $E_{kij}[E_{yij}(m)]$ and then transfers the message $E_{kij}[E_{yij}(m)]$ to a communication device 12. Here, the communication device 12 can be a router or a gateway. Then the communication device 12 encrypts the message $E_{kij}[E_{yij}(m)]$ using a network key $K_{mn}$ to obtain a message $E_{kmn}[E_{kij}[E_{yij}(m)]]$, and transfers the message $E_{kmn}[E_{kij}[E_{yij}(m)]]$ to a communication device 18 at the receiving end. Thereafter, the communication device 18 decrypts the message $E_{kmn}[E_{kij}[E_{yij}(m)]]$ using the same network key $K_{mn}$ to obtain a message $E_{kij}[E_{yij}(m)]$ and transfers this message $E_{kij}[E_{yij}(m)]$ to a cipher/decipher device 20. The cipher/decipher device 20 then decrypts the message $E_{kij}[E_{yij}(m)]$ using the same communication key $K_{ij}$ to obtain the message $E_{yij}(m)$ and transfers the message $E_{yij}(m)$ to a receiver, e.g., the user $P_j$. Thereafter, the user $P_j$ decrypts the message $E_{yij}(m)$ using the same session key $Y_{ij}$ to obtain the original message m. The communication key $K_{ij}$ and the session key $Y_{ij}$ are calculated as follows:

$$Y_{ij} = e_w^{x\,ij} \pmod{n} \tag{1}$$

$$K_{ij} = f(R_{ij}+t) + f(r_{ij}+t) \tag{2}$$

As shown formula (1), $e_w$, n and $x_{ij}$ are family subkeys of the session key $Y_{ij}$, which are respectively preserved in two trusted-key centers $TKC_1$ and $TKC_2$. As an example, the family subkeys $e_w$ and n are preserved in the trusted-key center $TKC_1$, and the family key $x_{ij}$ is preserved in the trusted-key center $TKC_2$.

Such a classification method can reduce the number of subkeys which have to be preserved in the trusted-key centers $TKC_1$ and $TKC_2$. If there are k (k is an integer) session keys which are not classified in this network system, the trusted-key centers $TKC_1$ and $TKC_2$ have to preserve 2k subkeys provided that each session key is divided into two subkeys. However, if there are k keys which are classified into u (u is also an integer) families as in this network system, then the trusted-key centers $TKC_1$ and $TKC_2$ only have to preserve k+u (<2k) subkeys, including u subkeys $e_w$ and k subkeys $x_{ij}$.

In certain situations (with an eavesdropper $P_m$), the communication device 12 directly transfers the received message $E_{kij}[E_{yij}(m)]$ to the communication device 18 without encryption operations. In this case, the eavesdropper $P_m$ does not require additional keys, and the communication device 18 at the receiving terminal does not require further decryption operations in order to complete a successful communication. At this time, the eavesdropper $P_m$ can receive the transferred message $E_{kij}[E_{yij}(m)]$ between the communication device 12 and the communication device 18 to eavesdrop the communication between the user $P_i$ and the user $P_j$.

As shown formula (2), f is a public one-way hash function, and t is a current time, which is also public information. $R_{ij}$ and $r_{ij}$ are communication subkeys of the communication key $K_{ij}$ used during communication between the user $P_i$ and the user $P_j$. The communication subkeys $R_{ij}$ and $r_{ij}$ are respectively preserved in the trusted-key center $TKC_1$ and the trusted-key center $TKC_2$, as are the family subkeys $e_w$, n and $x_{ij}$, and are used to calculate the communication key $K_{ij}$.

Using this structure, when an eavesdropper $P_m$ is authorized, e.g., given an authority certificate at time t to eavesdrop the communication between the user $P_i$ and the user $P_j$, the trusted-key center $TKC_1$ will give a hash value $f(R_{ij}+t)$ involving the communication subkey $R_{ij}$ and the current time t to the eavesdropper $P_m$, and the trusted-key center $TKC_2$ will give another hash value $f(r_{ij}+t)$ involving the communication subkey $r_{ij}$ and the current time t to the eavesdropper $P_m$. The eavesdropper $P_m$ then uses the given hash values $f(R_{ij}+t)$ and $f(r_{ij}+t)$ to obtain the key $K_{ij} = f(R_{ij}+t) + f(r_{ij}+t)$. Thereafter, the trusted-key center $TKC_2$ will give the registered family subkey $x_{ij}$ to the trusted-key center $TKC_1$ so that the trusted-key center $TKC_1$ can obtain the session key $Y_{ij}$, and transfers the session key $Y_{ij}$ to the eavesdropper $P_m$. This allows the eavesdropper $P_m$ to eavesdrop the communication between the user $P_i$ and the user $P_j$ using the communication key $K_{ij}$ and the session key $y_{ij}$.

Using this process, The session key $Y_{ij}$ can not be calculated unless the family subkeys $e_w$, n and $x_{ij}$ are all given, therefore neither the trusted-key center $TKC_1$ (knowing the family subkeys $e_w$ and n, but not knowing the family subkey $x_{ij}$, or the trusted-key center $TKC_2$ (knowing the family subkey $x_{ij}$, but not knowing the family subkeys $e_w$ and n) can find out the session key $Y_{ij}$ alone. Furthermore, the communication key $K_{ij}$ can not be calculated by the one-way hash function unless the communication subkeys $R_{ij}$ and $r_{ij}$ are both given, so neither the trusted-key center $TKC_1$ or the trusted-key center $TKC_2$ can obtain the communication key $K_{ij}$ alone. If the eavesdropper $P_m$ is authorized between time $t_1$ and time $t_2$ to eavesdrop the communication between the user $P_i$ and the user $P_j$, the trusted-key center $TKC_1$ will give two hash values $f(R_{ij}+t_1)$ and $f(R_{ij}+t_2)$ to the eavesdropper $P_m$, and the trusted-key center $TKC_2$ will give two hash values $f(r_{ij}+t_1)$ and $f(r_{ij}+t_2)$ to the eavesdropper $P_m$. The eavesdropper $P_m$ then calculates the key $K_{ij1} = f(R_{ij}+t_1) + f(r_{ij}+t_1)$ for the time $t_1$ and the key $K_{ij2} = f(R_{ij}+t_2) + f(r_{ij}+t_2)$ for the time $t_2$. However, since the one-way hash function is irreversible, the eavesdropper $P_m$ can not obtain the communication subkeys $R_{ij}$ and $r_{ij}$ from these hash values.

Additionally, if the eavesdropper $P_m$ is authorized at time t to eavesdrop a communication between a user $P_a$ and a user $P_b$ and between a user $P_c$ and a user $P_d$, the trusted-key center $TKC_1$ will give two hash values $f(R_{ab}+t)$ and $f(R_{cd}+t)$ to the eavesdropper $P_m$, and the trusted-key center $TKC_2$ will give two hash values $f(r_{ab}+t)$ and $f(r_{cd}+t)$ to the eavesdropper $P_m$. The eavesdropper $P_m$ then calculates the key $K_{ab} = f(R_{ab}+t) + f(r_{ab}+t)$ for a communication between the user $P_a$ and the user $P_b$ and the key $K_{cd} = f(R_{cd}+t) + f(r_{cd}+t)$ for a communication between the user $P_c$ and the user $P_d$. However, since the one-way hash function is irreversible, the eavesdropper $P_m$ can not obtain the communication subkeys $R_{ab}$, $r_{ab}$, $R_{cd}$ and $r_{cd}$ from these hash values.

If the eavesdropper $P_m$ is authorized between time $t_1$ and time $t_2$ to eavesdrop the communication between the user $P_a$ and the user $P_b$ and between the user $P_c$ and the user $P_d$, the trusted-key center $TKC_1$ will give four hash values $f(R_{ab}+t_1)$, $f(R_{cd}+t_1)$, $f(R_{ab}+t_2)$ and $f(R_{cd}+t_2)$ to the eavesdropper $P_m$, and the trusted-key center $TKC_2$ will give four hash values $f(r_{ab}+t_1)$, $f(r_{cd}+t_1)$, $f(r_{ab}+t_2)$ and $f(r_{cd}+t_2)$ to the eavesdropper $P_m$. The eavesdropper $P_m$ then calculates a key $K_{ab1} = f(R_{ab}+t_1) + f(r_{ab}+t_1)$ for the communication between the user $P_a$ and the user $P_b$ at the time $t_1$, and a key $K_{cd1} = f(R_{cd}+t_1) + f(r_{cd}+t_1)$ for the communication between the user $P_c$ and the user $P_d$ at the time $t_1$. The eavesdropper concurrently calculates a key $K_{ab2} = f(R_{ab}+t_2) + f(r_{ab}+t_2)$ for the communication between the user $P_a$ and the user $P_b$ at the time $t_2$, and a key $K_{cd2} = f(R_{cd}+t_2) + f(r_{cd}+t_2)$ for the communication between the user $P_c$ and the user $P_d$ at the time $t_2$. However, since the one-way hash function is irreversible, the eavesdropper $P_m$ can not obtain the communication subkeys $R_{ab}$, $r_{ab}$, $R_{cd}$ and $r_{cd}$ from these hash values.

The hash values $f(R_{ij}+t)$ and $f(r_{ij}+t)$ serve as switches controlled by the trusted-key centers $TKC_1$ and $TKC_2$ to have a trusted third party (such as a government sector) selectively conduct eavesdropping under certain situations. At the same time, the encryption process is designed to prevent an eavesdropper from eavesdropping a communication without being provided the necessary authority.

In accordance with the above, using the key management of the present invention, a single trusted-key center can not calculate a session key(s) without the use of an additional variable(s) from an additional trusted key center(s). By using this method, a security compromise of the trusted-key center(s) can be avoided. Furthermore, provided hash values use a current time, thus eliminating the use of a combined communication key(s) during an unauthorized time period (s), and the refresh frequency of the communication subkeys preserved in the trusted-key centers can be effectively lowered.

Compared with the conventional method, the key management method of the present invention can avoid unauthorized eavesdropping, while requiring the minimal preservation of subkeys (of an order of $t^2$, where t is the number of all users). This effectively reduces computational overhead in the network system since the one-way hash function calculation may be accomplished in a very fast and efficient manner.

It should be understood that the present invention is not limited to the preferred embodiment as disclosed above. Variations and modifications can be made by those who are skillful in the art without departing from the spirit and scope of the present invention as defined in the appended claims. Thus, this invention is not to be limited to the disclosed embodiment except as required by the appended claims.

What is claimed is:

1. A key management method to prevent illegal eavesdropping in a network system, comprising:

dividing session keys of the network system into a plurality of family subkeys and a plurality of communication subkeys;

providing a plurality of trusted-key centers for respectively preserving a part of the family subkeys and one of the communication subkeys, and generating a one-way hash value involving the preserved communication subkey and an open information;

each of the trusted-key centers passing the hash value to an eavesdropper according to an authority certificate;

each of the trusted-key centers interchanging the preserved family subkeys according to the authority certificate to obtain a session key which is passed to the eavesdropper; and the eavesdropper combining all the hash values from the trusted-key centers to obtain a communication key which is accompanied with the session key to eavesdrop an authorized communication.

2. The key management method as claimed in claim 1, wherein the open information is a current time.

3. The key management method as claimed in claim 2, wherein the hash value is obtained by calculating a one-way hash function being a sum of the preserved communication subkey and the current time.

4. The key management method as claimed in claim 3, wherein the communication key is combined by adding all the hash values from the trusted-key centers.

5. A method of encrypting a communication comprising the steps of:

encrypting an origination communication message using a session key to obtain a first encryption of the message;

encrypting the first encryption using a communication key to obtain a second encryption of the first encryption;

transferring the second encryption to a receiving end;

reversing the second and first encryption steps to obtain the origination communication message; and providing a plurality of trusted-key centers, wherein each of said plurality of trusted-key centers maintains a distinct part of at least the session key, a network key or the communication key.

6. The method of encrypting a communication according to claim 5, further including the steps of, encrypting the second encryption using the network key to obtain a third encryption of the second encryption, transferring the second encryption to the receiving end, and reversing the third, second and first encryption steps to obtain the origination communication message.

7. The method of encrypting a communication according to claim 6, further including the step of allowing an eavesdropper to obtain the origination communication message.

8. The method of encrypting a communication according to claim 7, wherein the step of allowing an eavesdropper to obtain the origination commination message includes the step of decrypting any one of at least the first, second or third encryption.

9. The method of encrypting a communication according to claim 5, further including the step of allowing an eavesdropper to obtain the origination communication message.

10. The method of encrypting a communication according to claim 9, further including the step limiting the eavesdropper access to the origination communication messaged based on a duration of time.

11. The method of encrypting a communication according to claim 9, further including the step of allowing encryption of a plurality of origination messages using at least one of the session, network or communication keys.

12. The method of encrypting a communication according to claim 11, further including the step of eavesdropping at least one of the plurality of messages.

13. The method of encrypting a communication according to claim 12, wherein the step of eavesdropping allows eavesdropping of at least one of the plurality of messages, or a number of the plurality of messages for a predetermined time duration.

14. The method of encrypting a communication according to claim 6, wherein the step of reversing includes the steps of, decrypting the third encryption using the network key to obtain the second encryption, decrypting the second encryption using the communication key to obtain the first encryption, and decrypting the first encryption using the session key to obtain the origination message.

* * * * *